(12) United States Patent
He et al.

(10) Patent No.: US 10,326,485 B2
(45) Date of Patent: *Jun. 18, 2019

(54) RECEIVER AND RECEIVING METHOD OF RECEIVER

(71) Applicant: HUAWEI TECHNOLOGIES CO., LTD., Shenzhen, Guangdong (CN)

(72) Inventors: Zhuobiao He, Shenzhen (CN); Jianfeng Wu, Shanghai (CN); Zhengxiang Ma, Bridgewater, NJ (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,544

(22) Filed: Nov. 8, 2017

(65) Prior Publication Data

US 2018/0069579 A1     Mar. 8, 2018

Related U.S. Application Data

(63) Continuation of application No. 15/458,757, filed on Mar. 14, 2017, now Pat. No. 9,843,350, which is a (Continued)

(51) Int. Cl.
*H04B 1/00* (2006.01)
*H04B 1/26* (2006.01)
(Continued)

(52) U.S. Cl.
CPC ............ *H04B 1/26* (2013.01); *H04B 1/005* (2013.01); *H04B 1/28* (2013.01); *H04B 1/30* (2013.01); *H04W 84/042* (2013.01)

(58) Field of Classification Search
None
See application file for complete search history.

(56) References Cited

U.S. PATENT DOCUMENTS

| 5,661,485 A | 8/1997 | Manuel |
| 5,822,688 A | 10/1998 | Eul |

(Continued)

FOREIGN PATENT DOCUMENTS

| CN | 1706107 A | 12/2005 |
| CN | 101316105 A | 12/2008 |
| CN | 101432974 A | 5/2009 |

*Primary Examiner* — Lana N Le
(74) *Attorney, Agent, or Firm* — Huawei Technologies Co., Ltd.

(57) ABSTRACT

A receiver and a receiving method of the receiver such that monolithic integration of multiple receiving channels can be implemented. The receiver includes a zero intermediate frequency channel, performing in-phase/quadrature (IQ) down conversion on a radio frequency signal at a first frequency band using a frequency division or frequency multiplication signal of a first oscillation signal, and a superheterodyne channel, performing down conversion on a radio frequency signal at a second frequency band using the frequency division or frequency multiplication signal of the first oscillation signal, where the first frequency band is different from the second frequency band. The zero intermediate frequency channel and the superheterodyne channel use a same oscillation signal or a same frequency division or frequency multiplication signal of the oscillation signal, thereby monolithic integration of multiple receiving channels can be implemented.

20 Claims, 3 Drawing Sheets

Related U.S. Application Data continuation of application No. 15/189,751, filed on Jun. 22, 2016, now Pat. No. 9,634,706, which is a continuation of application No. 14/086,726, filed on Nov. 21, 2013, now Pat. No. 9,401,732, which is a continuation of application No. PCT/CN2011/077140, filed on Jul. 14, 2011.

(51) Int. Cl.
*H04B 1/28* (2006.01)
*H04B 1/30* (2006.01)
*H04W 84/04* (2009.01)

(56) References Cited

U.S. PATENT DOCUMENTS

| | | | |
|---|---|---|---|
| 5,852,784 A * | 12/1998 | Ito | H03D 7/161 455/552.1 |
| 5,890,051 A | 3/1999 | Schlang et al. | |
| 7,266,361 B2 | 9/2007 | Burdett | |
| 8,054,221 B1 | 11/2011 | Luong et al. | |
| 8,823,583 B2 | 9/2014 | Hasch et al. | |
| 9,401,732 B2 * | 7/2016 | He | H04B 1/005 |
| 9,634,706 B2 * | 4/2017 | He | H04B 1/005 |
| 9,843,350 B2 * | 12/2017 | He | H04B 1/005 |
| 2001/0024962 A1 | 9/2001 | Bauer | |
| 2001/0045994 A1 * | 11/2001 | Maejima | H03D 5/00 348/731 |
| 2003/0228860 A1 | 12/2003 | Jou | |
| 2005/0117664 A1 * | 6/2005 | Adan | H03D 7/1441 375/316 |
| 2005/0202842 A1 | 9/2005 | Brobston et al. | |
| 2006/0025099 A1 | 2/2006 | Jung et al. | |
| 2006/0178165 A1 | 8/2006 | Vassiliou et al. | |
| 2006/0205376 A1 | 9/2006 | Brobston et al. | |
| 2007/0066268 A1 | 3/2007 | Simic et al. | |
| 2007/0105513 A1 | 5/2007 | Son et al. | |
| 2007/0111697 A1 | 5/2007 | Bellantoni et al. | |
| 2007/0259620 A1 * | 11/2007 | Joet | H04B 1/0025 455/15 |
| 2007/0298748 A1 | 12/2007 | Banh et al. | |
| 2009/0325518 A1 * | 12/2009 | Mattisson | H04B 1/109 455/131 |
| 2010/0097531 A1 * | 4/2010 | Miura | H04B 1/30 348/735 |
| 2010/0124257 A1 | 5/2010 | Yahya | |
| 2010/0159858 A1 * | 6/2010 | Dent | H04B 1/123 455/131 |
| 2011/0128999 A1 * | 6/2011 | Ruegamer | G01S 19/13 375/147 |
| 2011/0244812 A1 | 10/2011 | Cowley et al. | |
| 2012/0014479 A1 | 1/2012 | Choi | |
| 2013/0005299 A1 | 1/2013 | Raleigh | |
| 2014/0194081 A1 * | 7/2014 | Tohidian | H04B 1/0007 455/258 |

* cited by examiner

RECEIVER AND RECEIVING METHOD OF RECEIVER

CROSS-REFERENCE TO RELATED APPLICATIONS

This application is a continuation of U.S. patent application Ser. No. 15/458,757 filed on Mar. 14, 2017, which is a continuation of U.S. patent application Ser. No. 15/189,751 filed on Jun. 22, 2016, now U.S. Pat. No. 9,634,706. U.S. patent application Ser. No. 15/189,751 is a continuation of U.S. patent application Ser. No. 14/086,726 filed on Nov. 21, 2013, now U.S. Pat. No. 9,401,732. U.S. patent application Ser. No. 14/086,726 is a continuation of International Patent Application No. PCT/CN2011/077140, filed on Jul. 14, 2011. The aforementioned patent applications are hereby incorporated by reference in their entireties.

TECHNICAL FIELD

Embodiments of the present disclosure relate to the communications field, and in particular to a receiver and a receiving method of the receiver.

BACKGROUND

Currently, base station receivers, microwave transmission receivers, or terminal radio frequency integrated circuit (RFIC) receivers basically receive signals only at a single frequency band at a same time point, and a future evolution requirement is to concurrently receive signals at multiple frequency bands using ultra-wideband. With regard to a solution to concurrent multi-band receiving, there is no good solution currently. A most direct and basic architecture is implemented by simply connecting two or more single-band receivers in parallel.

If channels at multiple frequency bands all adopt a superheterodyne digital intermediate frequency (DIF) architecture, a cost, area, and power consumption of a multi-band receiver are multiple times those of a single-band receiver. For a $3^{rd}$ Generation (3G)/$4^{th}$ Generation (4G) base station, the number of components is relatively large and power consumption is relatively large. In addition, frequencies of voltage-controlled oscillator (VCOs) on channels are mutually independent and relatively close to each other, and therefore monolithic integration is inappropriate.

If channels at multiple frequency bands all adopt a zero intermediate frequency (ZIF) architecture, an integration level of each channel can be improved to some extent, but a cost, area, and power consumption of a multi-band receiver is multiple times those of a single-band receiver. When the zero intermediate frequency architecture is used in a Global System for Mobile communications (GSM) of a base station for multi-carrier receiving, image rejection and input second-order intercept point (IIP2) problems restricts an actual application. In addition, frequencies of VCOs on channels are mutually independent and relatively close to each other, and therefore monolithic integration is inappropriate.

As a solution, a zero intermediate frequency architecture may be adopted on a part of channels at multiple frequency bands, and a superheterodyne architecture may be adopted on other channels at the multiple frequency bands in order to combine advantages of the zero intermediate frequency architecture and the superheterodyne architecture, for example, allowing a signal in a scenario where linearity is not highly required such as a 3G/4G signal to go through a zero intermediate frequency channel and allowing a signal that requires high linearity such as a $2^{nd}$ Generation (2G) signal to go through a superheterodyne channel. However, in a process of implementing the present disclosure, the inventor finds that frequencies of VCOs on channels are mutually independent and relatively close to each other, and therefore monolithic integration is still inappropriate, thereby increasing complexity of solution configuration.

SUMMARY

Embodiments of the present disclosure provide a receiver and a receiving method of the receiver such that monolithic integration of multiple receiving channels can be implemented.

In one aspect, a receiver is provided and includes a zero intermediate frequency channel, performing in-phase/quadrature (IQ) down conversion on a radio frequency (RF) signal at a first frequency band using a frequency division or frequency multiplication signal of a first oscillation signal, and a superheterodyne channel, performing down conversion on an RF signal at a second frequency band using the frequency division or frequency multiplication signal of the first oscillation signal, where the first frequency band is different from the second frequency band.

In another aspect, a receiving method of a receiver is provided, where the receiver includes a zero intermediate frequency channel and a superheterodyne channel, and the method includes receiving a first oscillation signal, performing, by the zero intermediate frequency channel, IQ down conversion on an RF signal at a first frequency band using a frequency division or frequency multiplication signal of the first oscillation signal, and performing, by the superheterodyne channel, down conversion on an RF signal at a second frequency band using the frequency division or frequency multiplication signal of the first oscillation signal, where the first frequency band is different from the second frequency band.

According to the embodiments of the present disclosure, a zero intermediate frequency channel and a superheterodyne channel use a same oscillation signal or a same frequency division or frequency multiplication signal of the oscillation signal, which overcomes a problem that oscillation signals affect each other due to simple integration of two kinds of channels such that monolithic integration of multiple receiving channels can be implemented.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show only some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

Technical solutions in the present disclosure may apply to multiple communications systems, for example, a GSM system, a code division multiple access (CDMA) system, a wideband code division multiple access (WCDMA) system, a general packet radio service (GPRS) system, a long-term evolution (LTE) system, and the like.

A user equipment (UE) may communicate with one or more core networks through a radio access network (RAN). The UE may be a mobile terminal, for example, a mobile phone (or called a "cellular" phone) or a computer that has a mobile terminal, for example, the mobile terminal may be a portable, pocket-sized, handheld, computer-embedded, or vehicle-mounted mobile apparatus, which exchanges a language and/or data with the radio access network.

A base station may be a base transceiver station (BTS) in a GSM or CDMA system, may also be a Node B (NodeB) in a WCDMA system, and may still be an evolutional Node B (eNB or e-NodeB) in an LTE system, which is not limited in the present disclosure.

Figure 1:
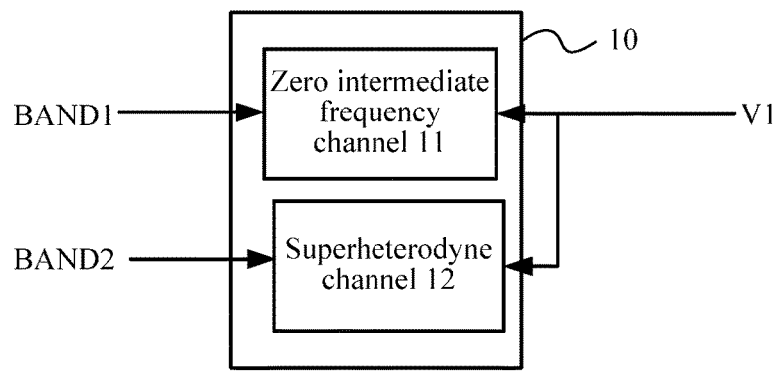
FIG. 1 is a schematic block diagram of a receiver according to an embodiment of the present disclosure.

FIG. 1 is a schematic block diagram of a receiver according to an embodiment of the present disclosure. A receiver 10 in FIG. 1 may be located in a base station or a UE and includes a zero intermediate frequency channel 11 and a superheterodyne channel 12.

The zero intermediate frequency channel 11 performs IQ down conversion on an RF signal at a first frequency band BAND1 using a frequency division or frequency multiplication signal of a first oscillation signal V1.

The superheterodyne channel 12 performs down conversion on an RF signal at a second frequency band BAND2 using the frequency division or frequency multiplication signal of the first oscillation signal V1.

The first frequency band BAND1 is different from the second frequency band BAND2.

According to this embodiment of the present disclosure, a zero intermediate frequency channel and a superheterodyne channel use a same oscillation signal or a same frequency division or frequency multiplication signal of the oscillation signal, which overcomes a problem that oscillation signals affect each other due to simple integration of two kinds of channels such that monolithic integration of multiple receiving channels can be implemented.

In this embodiment of the present disclosure, the frequency division or frequency multiplication signal of the first oscillation signal V1 includes the first oscillation signal V1 itself (that is, it may be considered as a one-time frequency signal). In the embodiment shown in FIG. 1, for brevity, only one zero intermediate frequency channel 11 and one superheterodyne channel 12 are described. However, this embodiment of the present disclosure is not limited to this. According to this embodiment of the present disclosure, as long as the two kinds of channels use a frequency division or frequency multiplication signal of a same oscillation signal, more zero intermediate frequency channels 11 or more superheterodyne channels 12 may be adopted as required. These changes all fall within the scope of the present disclosure.

For example, the BAND1 may be a 3G/4G frequency band, and the BAND2 may be another 2G/3G/4G frequency band. However, this embodiment of the present disclosure is not limited to this. Generally, a signal that has a relatively high receiving requirement may go through the superheterodyne channel 12, which may relieve a burden on a duplexer and facilitate miniaturization of the duplexer. According to this embodiment of the present disclosure, a problem such as in-band image rejection does not exist on a 2G superheterodyne receiving channel. A 3G/4G signal goes through a zero intermediate frequency channel, and a low pass filter (LPF)/an analog-to-digital converter (ADC) may be integrated together into a chip.

The first oscillation signal V1 may come from an oscillator integrated in the receiver and may also be an oscillation signal received by an oscillator outside the receiver, which is not limited in this embodiment of the present disclosure.

This embodiment of the present disclosure is described in further detail in the following with reference to specific examples. In the following examples, the receiver includes a first oscillator configured to generate the first oscillation signal V1. However, this embodiment of the present disclosure is not limited to this. The receiver according to this embodiment of the present disclosure may externally receive the first oscillation signal V1.

In addition, circuit diagrams in the following examples show only necessary components. However, the embodiments of the present disclosure are not limited to this. An auxiliary component, such as an amplifier (including an amplifier with a fixed gain, an amplifier with a changeable gain, or the like) and a filter (including an RF filter, an anti-alias filter, or the like), may be added before or after each component or between components. A part of components or all components of these auxiliary components may be integrated together with the following necessary components according to a practical need and may also be located outside an integrated chip.

Figure 2:
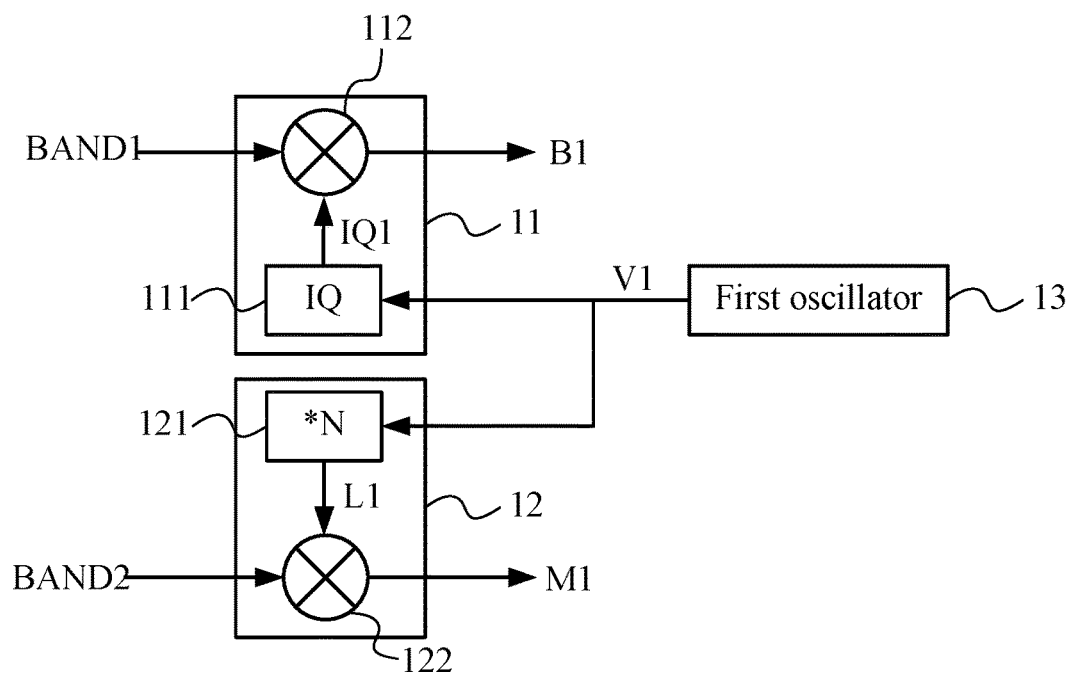
FIG. 2 is a schematic structural diagram of a receiver according to an embodiment of the present disclosure.

FIG. 2 is a schematic structural diagram of a receiver according to an embodiment of the present disclosure. A receiver in FIG. 2 includes a zero intermediate frequency channel 11, a superheterodyne channel 12, and a first oscillator 13.

The first oscillator 13 generates a first oscillation signal V1 and sends the first oscillation signal V1 to the zero intermediate frequency channel 11 and the superheterodyne channel 12. According to the embodiment shown in FIG. 2, the first oscillation signal V1 is directly sent to two kinds of channels, but this embodiment of the present disclosure is not limited to this. The V1 may also undergo frequency division or frequency multiplication before being separately sent to two kinds of channels. An implementation manner of the first oscillator 13 is a VCO. Optionally, a frequency range of the first oscillator 13 is adjustable.

The zero intermediate frequency channel 11 includes a first local oscillating unit 111 and a first frequency mixer 112. The first local oscillating unit 111 receives the first oscillation signal V1, and generates a first IQ local oscillation signal IQ1 according to the first oscillation signal V1. The first frequency mixer 112 receives the first IQ local oscillation signal IQ1, and performs IQ down conversion on an RF signal at a first frequency band BAND1 using the first IQ local oscillation signal IQ1 in order to generate a first baseband signal B1, where the first baseband signal B1 is used for ADC.

The superheterodyne channel 12 includes a second local oscillating unit 121 and a second frequency mixer 122. The second local oscillating unit 121 receives the first oscillation signal V1, and performs frequency division or frequency multiplication on the first oscillation signal V1 in order to generate a first superheterodyne local oscillation signal L1. The second frequency mixer 122 receives the first superheterodyne local oscillation signal L1, and performs down conversion on an RF signal at a second frequency band BAND2 using the first superheterodyne local oscillation signal L1 in order to generate a first intermediate frequency signal M1.

For example, it is assumed that the receiver in FIG. 2 is located in a base station, and the base station concurrently receives signals at two frequency bands, Universal Mobile Telecommunications System (UMTS) BAND1 (corresponding to BAND1) and DCS1800 (corresponding to BAND2). The frequency band DCS1800 generally has a GSM requirement, but UMTS BAND1 generally does not have a GSM requirement. An antenna concurrently receives signals at two frequency bands. After frequency bands of the signals at the two frequency bands are divided by a front-end duplexer (or a filter), the signal at the frequency band DCS1800 goes through the superheterodyne channel 12, and the signal at the frequency band UMTS BAND1 goes through the zero intermediate frequency channel 11. The two channels share a same VCO 13. Oscillation signals output by the VCO 13 are respectively sent to the first frequency mixer 112 on the zero intermediate frequency channel 11 and the second frequency mixer 122 on the superheterodyne channel 12 through circuits with different frequency division ratios or frequency multiplication ratios. For a simple example, an oscillation frequency V1 of the VCO 13 is selected as 1950 megahertz (MHz)×2=3900 MHz, after the frequency is divided by 2, an IQ first local oscillation signal IQ1 is generated as the local oscillation signal for UMTS BAND1, and after the frequency of the VCO is divided by 4, a local oscillation signal L1 of 975 MHz is provided as the first superheterodyne local oscillation for the superheterodyne channel. UMTS BAND1 directly changes into a zero frequency after undergoing simulated IQ down conversion and is sent to an ADC for sampling after connecting to an amplifier with a controllable gain and an anti-alias low-pass filter that are inside or outside a chip. An output frequency of the signal at the frequency band DCS1800 that has undergone 975 MHz signal frequency conversion changes to (1710 MHz~1785 MHz)−975 MHz=735 MHz~810 MHz (the first intermediate frequency signal M1).

Optionally, in an embodiment, if the first intermediate frequency signal M1 meets an input frequency range requirement of the ADC, the first intermediate frequency signal M1 may be directly used for analog-to-digital conversion. For example, the first intermediate frequency signal M1 is directly sampled by the ADC after passing an anti-alias filter. In this way, another frequency conversion process is not required, thereby saving components in a bill of material (BOM) and meeting a single-chip dual-band need.

If the first intermediate frequency signal M1 cannot meet the input frequency range requirement of the ADC, for example, performance of an ADC device is inadequate, down conversion processing may be further performed on the first intermediate frequency signal M1. The following describes an embodiment where down conversion is further performed on the first intermediate frequency signal M1.

Figure 3:
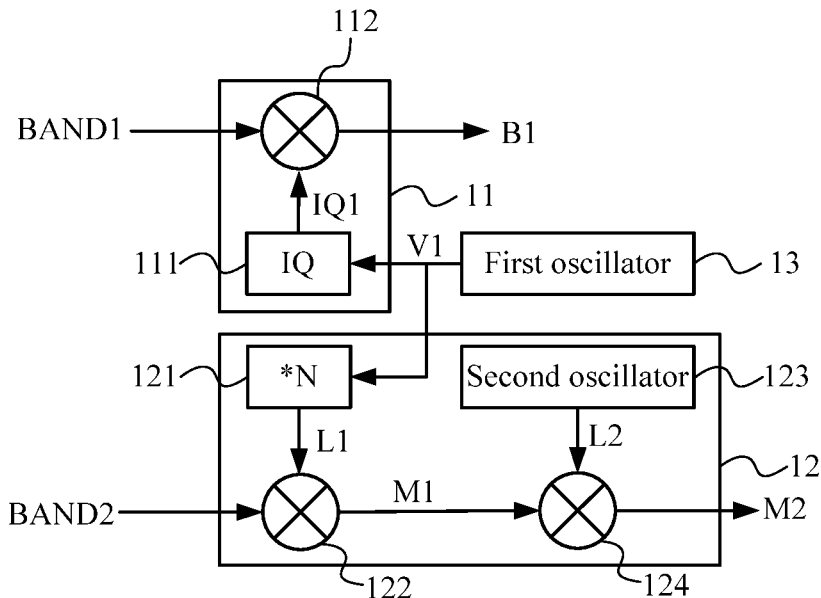
FIG. 3 is a schematic structural diagram of a receiver according to another embodiment of the present disclosure.

FIG. 3 is a schematic structural diagram of a receiver according to another embodiment of the present disclosure. In a receiver in FIG. 3, identical reference numerals are used for components identical to those in FIG. 2.

In addition to a second local oscillating unit 121 and a second frequency mixer 122, a superheterodyne channel 12 in FIG. 3 further includes a second oscillator 123 and a third frequency mixer 124.

The second oscillator 123 generates a second superheterodyne local oscillation signal L2. The second oscillator 123 in FIG. 3 directly sends the second superheterodyne local oscillation signal L2 to the third frequency mixer 124. However, this embodiment of the present disclosure is not limited to this. A frequency division/frequency multiplication component may also exist between the second oscillator 123 and the third frequency mixer 124, and sends an oscillation signal that is generated by the second oscillator 123 and has undergone frequency division/frequency multiplication, as the second superheterodyne local oscillation signal L2, to the third frequency mixer 124.

In addition, according to the embodiment shown in FIG. 3, two oscillators 13 and 123 are used. This embodiment of the present disclosure is not limited to this. The two oscillators 13 and 123 may be combined into one oscillator with a changeable-frequency output.

The third frequency mixer 124 receives the second superheterodyne local oscillation signal L2, and performs down conversion on a first intermediate frequency signal M1 using the second superheterodyne local oscillation signal L2 in order to generate a second intermediate frequency signal M2, where the second intermediate frequency signal M2 is used for analog-to-digital conversion.

The example described in the foregoing is still used. An output frequency of a signal at a frequency band DCS1800 (corresponding to BAND2) that has undergone 975 MHz signal frequency conversion changes into 735 MHz~810 MHz (the first intermediate frequency signal M1). The first intermediate frequency signal M1 may then undergo one time of frequency mixing performed by the third frequency mixer 124 and is converted into an appropriate second intermediate frequency signal M2 (for example, 100 MHZ~200 MHz) for ADC sampling.

In FIG. 3, a frequency division ratio and a frequency multiplication ratio of the second local oscillating unit 121 are configurable. A zero intermediate frequency channel 11 may include a low pass filter with a configurable bandwidth in order to support requirements for different receiving bandwidths. A superheterodyne channel 12 may include an amplifier with a changeable gain in order to adjust gains of an intermediate-frequency variable gain amplifier (VGA) or a zero-intermediate-frequency VGA, thereby reducing a dynamic requirement for an ADC. The L2 shown in FIG. 3 may also support a relatively wide adjusting range to ensure that a frequency of the second intermediate frequency signal M2 is appropriate.

On the superheterodyne channel 12, when an output frequency of the first intermediate frequency signal M1 is relatively high or there is a strict requirement on in-band image rejection, the first intermediate frequency signal M1 may undergo double-conversion to satisfy a high-performance scenario.

Figure 4:
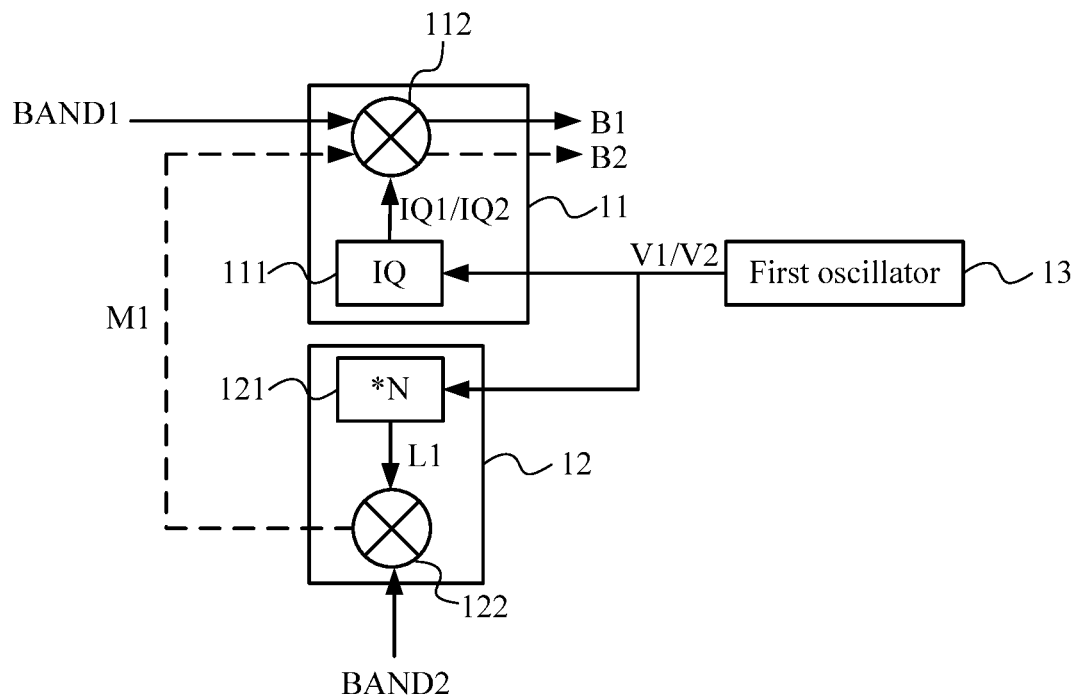
FIG. 4 is a schematic structural diagram of a receiver according to another embodiment of the present disclosure.

FIG. 4 is a schematic structural diagram of a receiver according to another embodiment of the present disclosure. In a receiver in FIG. 4, identical reference numerals are used for components identical to those in FIG. 2. In the embodiment shown in FIG. 4, a zero intermediate frequency channel 11 performs down conversion (as shown by arrows of dashed lines in FIG. 4) on a first intermediate frequency signal M1 output by a superheterodyne channel 12, which can save components.

A first oscillator 13 further generates a second oscillation signal V2. A first local oscillating unit 111 further receives the second oscillation signal V2, and generates a second IQ local oscillation signal IQ2 according to the second oscillation signal V2. Here, frequencies of a first oscillation signal V1 and the second oscillation signal V2 may be identical and may also be different. In a case where the two are different, the first oscillator 13 may be an oscillator with a changeable-frequency output.

A first frequency mixer 112 receives the second IQ local oscillation signal IQ2 and the first intermediate frequency signal M1, and performs IQ down conversion on the first intermediate frequency signal M1 using the second IQ local oscillation signal IQ2 in order to generate a second baseband signal B2, where the second baseband signal B2 is used for ADC.

According to the embodiment shown in FIG. 4, the types of devices and the number of devices can be reduced, and a same type of device may be adopted to support dual-band receiving, which mainly manifests in that a received signal (the first intermediate frequency signal M1) that is on the superheterodyne channel 12 and has undergone conversion for the first time may be sent to the zero intermediate frequency channel 11 of the same chip. In this case, VGA gain adjustment may be performed on the first intermediate frequency signal M1 such that a requirement of the GSM multi-carrier signal on image rejection is loosened to some extent. If the first intermediate frequency signal M1 is modulated into a zero frequency signal (the second baseband signal B2) using an IQ signal on the zero intermediate frequency channel, a working frequency is relatively low, and image rejection performance and IIP2 performance are relatively good. Therefore, an architecture where a multi-carrier signal of a 2G base station is converted into a zero frequency signal by adopting two times of conversion (first conversion is conversion on the superheterodyne channel, and second conversion is conversion on the zero intermediate frequency channel) and an architecture where a 3G/4G multi-carrier signal is converted into a zero frequency signal by adopting one time of conversion (conversion on the zero intermediate frequency channel) can be implemented. And a problem that image rejection and IIP2 cannot be satisfied during direct conversion of a multi-carrier signal of a 2G base station into a zero frequency signal is overcome.

Figure 5:
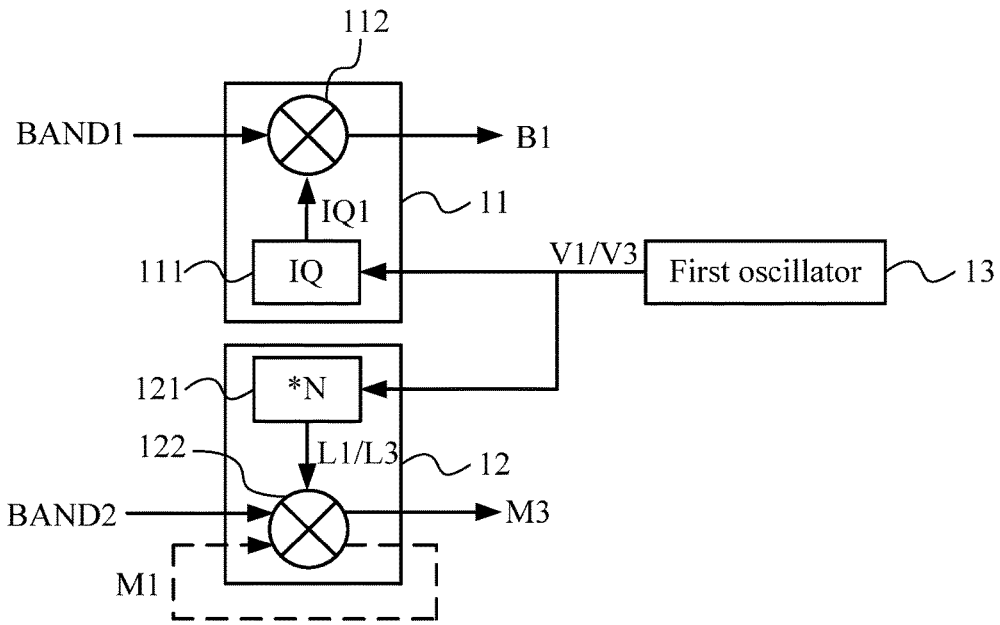
FIG. 5 is a schematic structural diagram of a receiver according to another embodiment of the present disclosure.

FIG. 5 is a schematic structural diagram of a receiver according to another embodiment of the present disclosure. In a receiver in FIG. 5, identical reference numerals are used for components identical to those in FIG. 2. In the embodiment shown in FIG. 5, a second frequency mixer 122 on a superheterodyne channel 12 performs down conversion (as shown by arrows of dashed lines in FIG. 5) again on a first intermediate frequency signal M1 output by the superheterodyne channel 12, which can save components.

A first oscillator 13 further generates a third oscillation signal V3. A second local oscillating unit 121 further receives the third oscillation signal V3, and performs frequency division or frequency multiplication on the third oscillation signal V3 in order to generate a third superheterodyne local oscillation signal L3.

The second frequency mixer 122 further receives the third superheterodyne local oscillation signal L3 and the first intermediate frequency signal M1, and performs down conversion on the first intermediate frequency signal M1 using the third superheterodyne local oscillation signal L3 in order to generate a third intermediate frequency signal M3, where the third intermediate frequency signal M3 is used for analog-to-digital conversion.

According to the embodiment shown in FIG. 5, the types of devices and the number of devices can be reduced. For example, after being converted into a first intermediate frequency signal M1 through first conversion, a 2G base station signal (at BAND2) may be converted into any intermediate frequency signal through another conversion on the superheterodyne channel 12 of the same chip and then be sent to an ADC for sampling and quantization. Frequency setting of L3 is different from that of L1. For example, a frequency range of a first oscillator 13 on a designed chip is adjustable, and frequencies of output oscillation signals V1 and V3 are different such that a frequency of L1 is different from that of L3. Alternatively, frequencies of oscillation signals V1 and V3 that are output by the first oscillator 13 may be identical, and a frequency range of the first oscillator 13 is nonadjustable. In this case, a frequency division ratio of the second local oscillating unit 121 is adjustable such that a frequency of an output L1 is different from that of an output L3.

A frequency division ratio and a second local oscillation signal of the superheterodyne channel 12 may be flexibly configured, thereby enhancing flexibility in selecting an intermediate frequency for a superheterodyne channel and selecting a sampling rate for an ADC.

In this embodiment of the present disclosure, a zero intermediate frequency channel 11 and the superheterodyne channel 12 share an oscillation signal. A local oscillation signal L1 on the superheterodyne channel may be obtained by performing frequency division or frequency multiplication on the first oscillation signal V1 to some extent, where this frequency division ratio or frequency multiple is configurable.

A signal converted by the superheterodyne channel 12 may be converted into a baseband signal through second conversion completed by the zero intermediate frequency channel 11 of the same chip, may also be down-converted by another independent chip into a low intermediate frequency signal before sampling, or is down-converted by the same superheterodyne channel 12 into a low intermediate frequency signal before sampling, and may also be directly sampled by the ADC.

A signal that has a relatively high receiving requirement, such as a 2G/3G/4G signal, goes through a superheterodyne channel when the receiver is located in a base station. The superheterodyne channel relieves a burden on a duplexer and facilitates miniaturization of the duplexer. A problem such as in-band image rejection does not exist on 2G superheterodyne. A 3G/4G signal goes through a zero intermediate frequency channel, and an LPF/ADC may be integrated together into a chip. A frequency division ratio of the superheterodyne channel and a second local oscillation signal may be flexibly configured, thereby enhancing flexibility in selecting an intermediate frequency for a superheterodyne channel and selecting a sampling rate for an ADC.

In this embodiment of the present disclosure, a problem that VCOs affect each other during simple integration of two channels is overcome such that two or more receiving channels that work concurrently can be integrated. According to this embodiment of the present disclosure, single chip encoding may be adopted to satisfy combinations of various different frequency bands of different standards 2G/3G/4G, thereby minimizing types of bill of materials (BOM) components.

According to this embodiment of the present disclosure, an intermediate frequency can be selected for a superheterodyne channel more flexibly such that an optimal combination may be selected in the terms of duplexer dimensions, ADC requirements, and the like. A zero intermediate frequency channel significantly simplifies the BOM and an integration level is high, that is, a signal mixing component including an ADC may be integrated.

Figure 6:
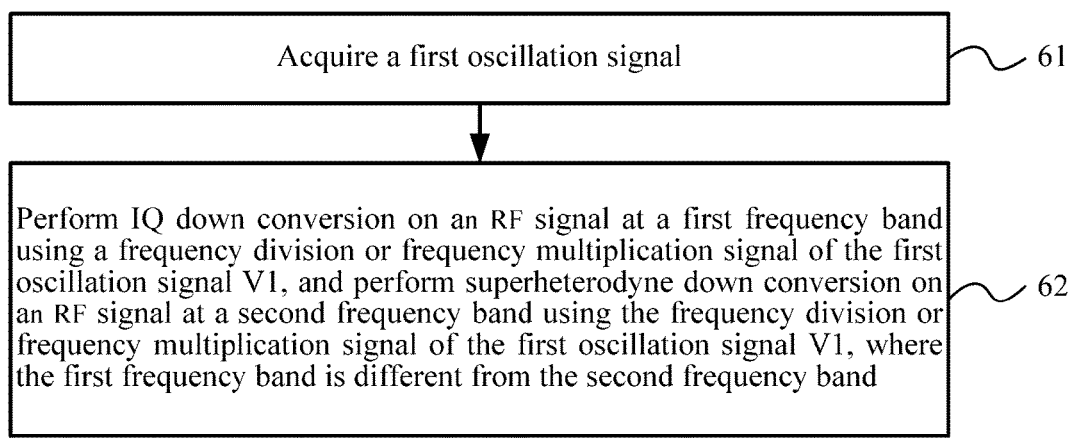
FIG. 6 is a flowchart of a receiving method according to an embodiment of the present disclosure.

FIG. 6 is a flowchart of a receiving method according to an embodiment of the present disclosure. A receiving method in FIG. 6 may be executed by the receiver 10 in FIG. 1. The receiving method in FIG. 6 is described with reference to FIG. 1. The method includes the following steps.

Step 61: Acquire a first oscillation signal V1. For example, the first oscillation signal V1 may be generated by an oscillator (such as the first oscillator 13 shown in FIG. 2 to FIG. 5) inside the receiver 10, or the first oscillation signal V1 is received from an oscillator outside the receiver 10.

Step 62: Perform IQ down conversion on an RF signal at a first frequency band using a frequency division or frequency multiplication signal of the first oscillation signal V1, and perform superheterodyne down conversion on an RF signal at a second frequency band using the frequency division or frequency multiplication signal of the first oscillation signal V1, where the first frequency band is different from the second frequency band.

According to this embodiment of the present disclosure, a zero intermediate frequency channel and a superheterodyne channel use a same oscillation signal or a same frequency division or frequency multiplication signal of the oscillation signal, which overcomes a problem that oscillation signals affect each other due to simple integration of two kinds of channels such that monolithic integration of multiple receiving channels can be implemented.

In this embodiment of the present disclosure, the frequency division or frequency multiplication signal of the first oscillation signal V1 includes the first oscillation signal V1 itself (that is, it may be considered as a one-time frequency signal).

For example, BAND1 may be a 3G/4G frequency band, and BAND2 may be another 2G/3G/4G frequency band. However, this embodiment of the present disclosure is not limited to this. Generally, a signal that has a relatively high receiving requirement may go through a superheterodyne channel, which may relieve a burden on a duplexer and facilitate miniaturization of the duplexer. According to this embodiment of the present disclosure, a problem such as in-band image rejection does not exist on a 2G superheterodyne receiving channel. A 3G/4G signal goes through a zero intermediate frequency channel, and a LPF/ADC may be integrated together into a chip.

Each process in the receiving method in FIG. 6 may be implemented by the receiver shown in FIG. 2 to FIG. 5, a signal converted by the superheterodyne channel 12 may be converted into a baseband signal through second conversion completed by a zero intermediate frequency channel 11 of the same chip, may also be down-converted by another independent chip into a low intermediate frequency signal before sampling, or is down-converted by the same superheterodyne channel 12 into a low intermediate frequency signal before sampling, and may also be directly sampled by an ADC.

For example, referring to FIG. 2, in step 62 in FIG. 6, a first IQ local oscillation signal IQ1 may be generated by a first local oscillating unit 111 according to the first oscillation signal V1. Then, a first frequency mixer 112 performs IQ down conversion on an RF signal at a first frequency band BAND1 using the first IQ local oscillation signal IQ1 in order to generate a first baseband signal B1. The first baseband signal B1 is used for analog-to-digital conversion.

Optionally, in an embodiment, the first oscillation signal V1 may be generated by a first oscillator 13, or the first oscillation signal V1 may be received externally.

In addition, in step 62 in FIG. 6, a second local oscillating unit 121 may perform frequency division or frequency multiplication on the first oscillation signal V1 in order to generate a first superheterodyne local oscillation signal L1. Then, a second frequency mixer 122 performs down conversion on an RF signal at a second frequency band BAND2 using the first superheterodyne local oscillation signal L1 in order to generate a first intermediate frequency signal M1.

Optionally, in an embodiment, the first intermediate frequency signal M1 may be directly used for ADC if the first intermediate frequency signal M1 meets an input frequency range requirement of the ADC. For example, the first intermediate frequency signal M1 is directly sampled by the ADC after passing an anti-alias filter.

The first intermediate frequency signal M1 may be directly used for analog-to-digital conversion if the first intermediate frequency signal M1 meets the input frequency range requirement of the ADC. In this way, another conversion process is not required in this embodiment of the present disclosure such that a BOM may be saved and a single-chip dual-band need may be met.

Referring to FIG. 3, in step 62 in FIG. 6, a second superheterodyne local oscillation signal L2 may be generated by a second oscillator 123. Then, a third frequency mixer 124 performs down conversion on the first intermediate frequency signal M1 using the second superheterodyne local oscillation signal L2 in order to generate a second intermediate frequency signal M2. The second intermediate frequency signal M2 is used for ADC.

On the superheterodyne channel 12, when an output frequency of the first intermediate frequency signal M1 is relatively high or there is a strict requirement on in-band image rejection, the first intermediate frequency signal M1 according to this embodiment of the present disclosure may undergo double-conversion to satisfy a high-performance scenario.

Optionally, in another embodiment, referring to FIG. 4, a second oscillation signal V2 may be generated by the first oscillator 13. In this case, a second IQ local oscillation signal IQ2 is generated by the first local oscillating unit 111 according to the second oscillation signal V2. Here, frequencies of the first oscillation signal V1 and the second oscillation signal V2 may be identical and may also be different.

Then, the first frequency mixer 112 performs IQ down conversion on the first intermediate frequency signal M1 using the second IQ local oscillation signal IQ2 in order to generate a second baseband signal B2. The second baseband signal B2 is used for ADC.

In this way, according to this embodiment of the present disclosure, types of devices and the number of devices can be reduced, and a same type of device may be adopted to support dual-band receiving.

Optionally, in another embodiment, referring to FIG. 5, a third oscillation signal V3 may be generated by the first oscillator 13. A second local oscillating unit 121 performs frequency division or frequency multiplication on the third oscillation signal V3 in order to generate a third superheterodyne local oscillation signal L3.

Then, the second frequency mixer 122 performs down conversion on the first intermediate frequency signal M1 using the third superheterodyne local oscillation signal L3 in order to generate a third intermediate frequency signal M3. The third intermediate frequency signal M3 is used for ADC.

In this way, according to this embodiment of the present disclosure, the types of devices and the number of devices can also be reduced.

Persons of ordinary skill in the art may appreciate that, in combination with the examples described in the embodiments disclosed in this specification, units and algorithm steps may be implemented by electronic hardware, computer software, or a combination of the two. In order to clearly describe the interchangeability between the hardware and the software, the foregoing has generally described compositions and steps of each embodiment according to functions. Whether these functions are performed in a hardware or software manner depends on particular applications and design constraint conditions of the technical solutions. Persons skilled in the art may use a different method to implement the described functions for each particular application, but it should not be considered that such implementation goes beyond the scope of the present disclosure.

It can be clearly understood by persons skilled in the art that, to achieve the purpose of convenient and the brief description, for a detailed working process of the receiving method, reference may be made to the corresponding process in the foregoing apparatus embodiment, and details are not described herein again.

In several embodiments provided in the present application, it should be understood that the disclosed system, apparatus, and method may be implemented in other manners. For example, the described apparatus embodiment is only exemplary. For example, the unit division is only logical function division and may be other division in actual implementation. For example, multiple units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

The integrated unit may be stored in a computer-readable storage medium when the integrated unit are implemented in the form of a software functional unit and sold or used as an independent product. Based on such an understanding, the technical solutions of the present disclosure essentially, or the part contributing to the prior art, or all or a part of the technical solutions may be implemented in the form of a software product. The computer software product is stored in a storage medium, and includes several instructions used for instructing a computer device (which may be a personal computer, a server, or a network device) to perform all or a part of the steps of the methods described in the embodiments of the present disclosure. The foregoing storage medium includes any medium that can store program codes, such as a universal serial bus (USB) flash disk, a removable hard disk, a read-only memory (ROM), a random access memory (RAM), a magnetic disk, or an optical disk.

The foregoing descriptions are only specific embodiments of the present disclosure, but are not intended to limit the protection scope of the present disclosure. Any variation or replacement readily figured out by persons skilled in the art within the technical scope disclosed in the present disclosure shall all fall within the protection scope of the present disclosure. Therefore, the protection scope of the present disclosure shall be subject to the protection scope of the claims.

What is claimed is:

1. A receiver, comprising:
a zero intermediate frequency channel, and a superheterodyne channel,
wherein the zero intermediate frequency channel comprises:
a first local oscillator and a first frequency mixer coupled to the first local oscillator;
wherein the first local oscillator is configured to:
receive a first oscillation signal; and
generate a first in-phase/quadrature (IQ) local oscillation signal according to the first oscillation signal;
wherein the first frequency mixer is configured to:
receive the first IQ local oscillation signal from the first local oscillator; and
generate a first baseband signal by performing an IQ down conversion on a radio frequency signal at a first frequency band using the first IQ local oscillation signal;
wherein the superheterodyne channel comprises:
a second local oscillator and a second frequency mixer coupled to the second local oscillator;
wherein the second local oscillator is configured to:
receive the first oscillation signal; and
generate a first intermediate frequency local oscillation signal according to the first oscillation signal;
wherein the second frequency mixer is configured to:
receive the first intermediate frequency local oscillation signal from the second local oscillator; and
generate a first intermediate frequency signal by performing a down conversion on a radio frequency signal at a second frequency band using the first intermediate frequency local oscillation signal;
wherein the zero intermediate frequency channel and the superheterodyne channel are configured to work concurrently.

2. The receiver according to claim 1, wherein in generating the first IQ local oscillation signal according to the first oscillation signal, the first local oscillator is configured to:
generate the first IQ local oscillation signal by performing a frequency division or a frequency multiplication on the first oscillation signal.

3. The receiver according to claim 1, wherein in generating the first intermediate frequency local oscillation signal according to the first oscillation signal, the second local oscillator is configured to:
generate the first intermediate frequency local oscillation signal by performing a frequency division or a frequency multiplication on the first oscillation signal.

4. The receiver according to claim 1, wherein the zero intermediate frequency channel and the superheterodyne channel are monolithically integrated in a same chip in the receiver.

5. The receiver according to claim 1, further comprising:
at least one Analog-Digit Converter (ADC) coupled to the first frequency mixer and the second frequency mixer; wherein the ADC is configured to:
perform an analog-to-digital conversion on the first baseband signal and the first intermediate frequency signal.

6. The receiver according to claim 5, wherein the at least one ADC, the zero intermediate frequency channel, and the superheterodyne channel are monolithically integrated in a same chip in the receiver.

7. The receiver according to claim 5, wherein the at least one ADC comprises:
a first ADC coupled to the first frequency mixer and configured to:
sample the first baseband signal; and
perform the analog-to-digital conversion on the first baseband signal;
and a second ADC coupled to the second frequency mixer and configured to:
sample the first intermediate frequency signal; and
perform the analog-to-digital conversion on the first intermediate frequency signal.

8. The receiver according to claim 1, further comprising at least one antenna coupled to the zero intermediate frequency channel and the superheterodyne channel, wherein the at least one antenna is configured to concurrently receive the radio frequency signal at the first frequency band and the radio frequency signal at the second frequency band.

9. The receiver according to claim 1, further comprising an oscillation signal generator coupled to the first local oscillator and the second local oscillator, and configured to generate the first oscillation signal.

10. The receiver according to claim 9, wherein the first oscillation signal is generated based on an oscillation signal from an oscillator outside the receiver.

11. The receiver according to claim 1, wherein the receiver is a component of a mobile terminal.

12. The receiver according to claim 1, wherein the first frequency band belongs to a first cellular communication system, and the second frequency band belongs to a second cellular communication system different from the first communication system.

13. The receiver according to claim 12, wherein the first cellular communication system is a second Generation (2G), third Generation (3G) or fourth Generation (4G) communication system.

14. The receiver according to claim 13, wherein the 3G communication system is a code division multiple access (CDMA) communication system or a wideband code division multiple access (WCDMA) communication system, wherein the 4G communication system is a long-term evolution (LTE) communication system, and wherein the 2G communication system is a Global System for Mobile communications (GSM) communication system or a general packet radio service (GPRS) communication system.

15. A method for use by a receiver, wherein the receiver comprises a zero intermediate frequency channel and a superheterodyne channel, and wherein the method comprises:
generating, by a first local oscillator in the zero intermediate frequency channel, a first in-phase/quadrature (IQ) local oscillation signal according to a received first oscillation signal;
performing, by a first frequency mixer in the zero intermediate frequency channel, IQ down conversion on a radio frequency signal at a first frequency band using the first IQ local oscillation signal to generate a first baseband signal;
generating, by a second local oscillator in the superheterodyne channel, a first intermediate frequency local oscillation signal according to the first oscillation signal; and
performing, by a second frequency mixer in the superheterodyne channel, down conversion on a radio frequency signal at a second frequency band using the first intermediate frequency local oscillation signal to generate a first intermediate frequency signal;
wherein the zero intermediate frequency channel and the superheterodyne channel are configured to work concurrently.

16. The method according to claim 15, wherein generating the first IQ local oscillation signal comprises:
generating, by the first local oscillator in the zero intermediate frequency channel, the first IQ local oscillation signal by performing a frequency division or a frequency multiplication on the first oscillation signal.

17. The method according to claim 15, wherein generating the first intermediate frequency local oscillation signal comprises:
generating, by the second local oscillator in the superheterodyne channel, the first intermediate frequency local oscillation signal by performing a frequency division or a frequency multiplication on the first oscillation signal.

18. The method according to claim 15, wherein the receiver further comprises at least one Analog-Digit Converter (ADC), and the method further comprises:
performing, by the at least one ADC, an analog-to-digital conversion on the first baseband signal and the first intermediate frequency signal.

19. The method according to claim 15, wherein the first frequency band belongs to a first cellular communication system, and the second frequency band belongs to a second cellular communication system being different from the first communication system.

20. The method according to claim 19, wherein the first cellular communication system is a second Generation (2G), third Generation (3G) or fourth Generation (4G) communication system.

* * * * *